(12) United States Patent
Nagori

(10) Patent No.: US 8,675,737 B2
(45) Date of Patent: Mar. 18, 2014

(54) METHOD AND APPARATUS FOR PREDICTIVE REFERENCE DATA TRANSFER SCHEME FOR MOTION ESTIMATION

(75) Inventor: Soyeb Nagori, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 403 days.

(21) Appl. No.: 12/899,897

(22) Filed: Oct. 7, 2010

(65) Prior Publication Data

US 2011/0103481 A1 May 5, 2011

(51) Int. Cl.
*H04B 1/66* (2006.01)
(52) U.S. Cl.
USPC ............ 375/240.16; 375/240.12; 375/240.15; 375/240.14; 382/236; 382/238; 382/243
(58) Field of Classification Search
USPC ............. 375/240.16, 240.12, 240.15, 240.14; 382/236, 238, 243
See application file for complete search history.

(56) References Cited

U.S. PATENT DOCUMENTS 6,826,294 B1 * 11/2004 Bakhmutsky ................ 382/107
7,006,100 B2 * 2/2006 Phong et al. .................. 345/557

* cited by examiner

*Primary Examiner* — Shawn An
(74) *Attorney, Agent, or Firm* — Mirna Abyad; W. James Brady; Frederick J. Telecky, Jr.

(57) ABSTRACT

A method and apparatus for predicting reference data transfer scheme for motion estimation. The method includes computing, via the processor, hypothetical rectangle region in reference frame containing all the predicting and reference data for doing motion estimation search around the region, if the macroblock is not the first in a row, utilizing overlap with previously fetched reference data, computing overlap with previously fetched reference data, and transferring needed data, invalidating any predictor, wherein the predictor is not part of the fetched data, and regulating the motion estimation and setting the motion vector to an effective value based on the fetched and computed data.

3 Claims, 5 Drawing Sheets

METHOD AND APPARATUS FOR PREDICTIVE REFERENCE DATA TRANSFER SCHEME FOR MOTION ESTIMATION

BACKGROUND OF THE INVENTION

1. Field of the Invention

Embodiments of the present disclosure relate to video processing, and more specifically, to predictive reference data transfer scheme for motion estimation.

2. Description of the Related Art

In high definition (HD) resolution encoding, large search range is usually employed for guaranteeing good video quality at limited bitrates. Some encoders use two approaches for fetching reference data from external memory to internal memory namely, growing window and sliding window. In both these approaches, large horizontal search ranges can be supported but only limited vertical search ranges are possible. Hence we will focus mainly on vertical search ranges. With the growing window approach, maximum vertical search range may be constrained by the availability of internal memory. Whereas, in the sliding window approach, usually; it is bandwidth of external memory to internal memory data transfer that can be supported. While horizontal search range in sliding window is constrained by the availability of internal memory. In some processors, growing window approach can support maximum vertical search range of +/−32 pixels, in case of predictive (P) picture, and +/−16 pixels, in case of bi-direction predictive (B) picture. Where as sliding window can support vertical search range of +/−64 pixels, in case of P picture, and +/−24 pixels, in case of B picture, for 256 KB of internal memory and with 1 GBPS external memory bandwidth for 1080 encoding. For IBBP encoding type, vertical search increase beyond +/−64 pixels for P picture and +/−24 pixels for B picture, which shows improvement in both PSNR as well as visual quality.

Other processors maintain a usage of +/−64 pixels vertical search range in case of B pictures; hence, large search ranges are essential for guaranteeing high quality video. However, this comes at the cost of significant increase in external memory bandwidth. For an example, increasing vertical search ranges to +/−96 pixels for P picture and +/−48 pixels for B picture increases external memory bandwidth by around 370 MBPS which will be restrictive on many devices.

Therefore, there is a need for reducing external memory bandwidth and still support larger search ranges.

SUMMARY OF THE INVENTION

Embodiments of the present invention relate to a method and apparatus for predicting reference data transfer scheme for motion estimation. The method includes computing, via the processor, hypothetical rectangle region in reference frame containing all the predicting and reference data for doing motion estimation search around the region, if the macroblock (MB) is not the first in a row, utilizing overlap with previously fetched reference data, computing overlap with previously fetched reference data, and transferring needed data, invalidating any predictor, wherein the predictor is not part of the fetched data, and regulating the motion estimation and setting the motion vector to an effective value based on the fetched and computed data.

BRIEF DESCRIPTION OF THE VIEWS OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE EMBODIMENTS

For high-definition (HD) resolution encoding, different search ranges need to be employed for improving video quality at limited bitrates. Existing encoders use two approaches, for example a growing window approach and a sliding window approach, for fetching reference data from an external memory to an internal memory. In both the approaches, increased horizontal search ranges can be supported but only limited vertical search ranges are possible. With the growing window approach, a vertical search range that can be supported is constrained by a lack of available internal memory. For the sliding window approach, a vertical search range is limited due to bandwidth constraints for data transfer from the external memory to the internal memory. Further, in the sliding window approach, an increased horizontal search range is constrained due to the lack of available internal memory.

In one example, in a 1080 encoding with 256 KB of internal memory, the growing window approach can support the vertical search range of +/−32 pixels for a predictive (P) picture and +/−16 pixels for a bi-direction predictive (B) picture. For the 1080 encoding with 256 KB of internal memory and 1 Giga bytes per second (GBPS) external memory bandwidth, the sliding window approach can support the vertical search range of +/−64 pixels for the P picture and +/−24 pixels for the B picture.

In another example, for an encoding type where the picture type Intra (I), predictive pictures (P) and bi-predictive pictures (B) (IBBP) coding type are used, an increase in the vertical search range beyond +/−64 pixels for the P picture and +/−24 pixels for the B picture causes an improvement in peak signal-to-noise ratio (PSNR) and video quality. Hence usage of the search ranges provides high quality video. Further, increasing the vertical search ranges to +/−96 pixels for the P picture and +/−48 pixels for the B picture results in an increase in the external memory bandwidth by around 370 Mega byte per second (MBPS). Hence, there is a need for reducing the external memory bandwidth for the increased search ranges.

Figure 1:
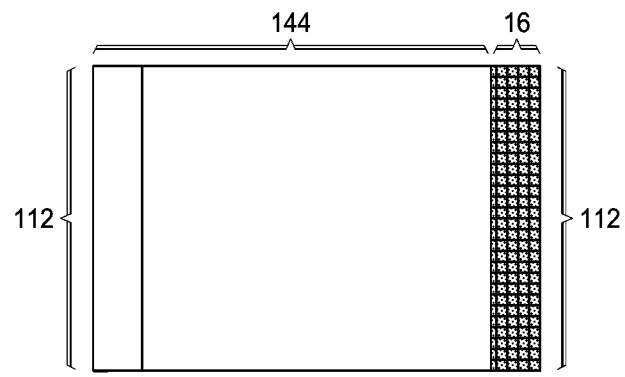
FIG. 1 illustrates a reference data transfer scheme in a sliding window technique.

FIG. 1 illustrates a reference data transfer scheme in a sliding window technique. The sliding window approach does fixed amount of data transfer for each macro block. In the present disclosure, a predictive data transfer is performed based on a need. Prediction of data can be performed using knowledge of predictors and motion estimation search patterns. Examples of techniques for the prediction of data include, but are not limited to, a skip pel 1, a skip pel 2, a skip pel 4, or any fraction skip pel technique.

Existing approaches fetch similar amount of reference data irrespective of kind of motion present in a video sequence. The present disclosure describes transferring more reference data when required, for example in fast moving regions in the video sequence. However, transfer of the reference data is reduced for cases such as in static or slow moving regions.

In the sliding window approach with the search range of +/−144 pixels in a horizontal direction and +/−48 pixels in a vertical direction, 16*(48+48+16)=1792 reference pixels for each macro block is fetched. The fetching of reference pixels can be excluded for first few macro blocks.

In some embodiments, motion estimation (ME) algorithms used in HD based devices can be based on predictors. As such, a portion of the reference data is left unused as predictor based ME algorithms search only in the regions that are indicated by the predictors having a match. However, the present disclosure uses knowledge of the actual data transfer needs instead of transferring fixed number of pixels and transfers only part of the reference data that is going to be used in the ME algorithm search.

Figure 2:
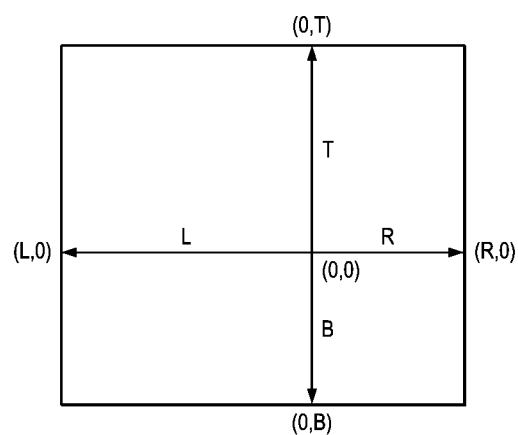
FIG. 2 illustrates a reference data block for a first macro block in a row, in accordance with one embodiment.

FIG. 2 illustrates a reference data block 200 for a first macro block in a row. For the first macro block (MB) present in a row of FIG. 1, a method for reference data transfer scheme using knowledge of predictors and subsequent search patterns is provided. Minimum area that needs to be fetched from the external memory is determined using reference data transfer scheme.

The reference data block 200 can include one or more macro blocks. A coordinate center (C) is assumed to be present at top-left corner of the first microblock (MB), where the first MB illustrates the data transfer. R is a pixel data towards the right from the coordinate center, L is a pixel data towards the left from the coordinate center, B is a pixel data towards the bottom from the coordinate center and T is a pixel data towards the top from the coordinate center.

Figure 3:
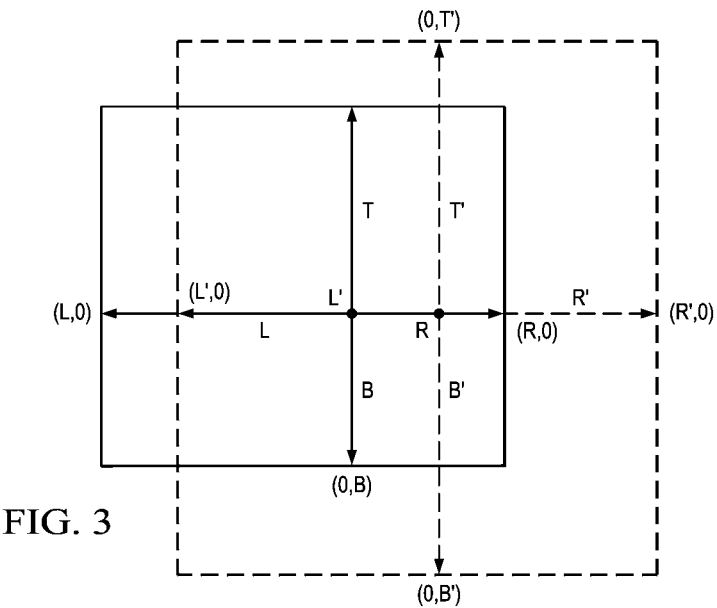
FIG. 3 illustrates a reference data block for a second macro block in a row, in accordance with one embodiment.

FIG. 3 illustrates a reference data block 300 for a second MB. A coordinate center (C1) is assumed for the second MB and a rectangle of dotted lines illustrates the reference data block 300. For the second MB, and the coordinator center (C1) the reference data includes R' pixel data towards the right from C1, L' pixel data towards the left from C1, B' pixel data towards the bottom from C1 and T' pixel data towards the top from C1. In the reference data transfer scheme, (B−T+1)*(R−L+1) pixels are transferred for the second MB instead of 112*144 that is needed using the sliding window approach.

Figure 4:
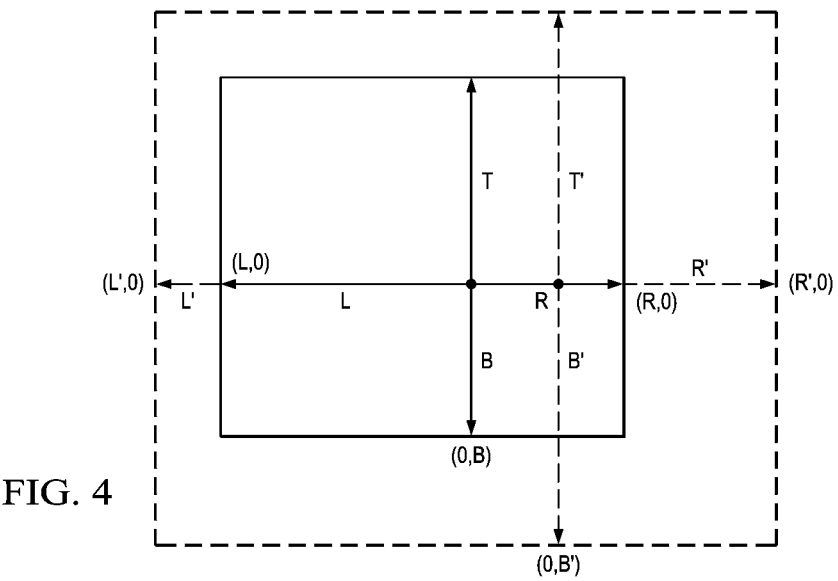
FIG. 4 illustrates a reference data block for a macro block, in accordance with another embodiment.

FIG. 4 illustrates a reference data block 400 for a MB. Few percentages of MBs may need transferring of data from left of a previous MB. In the illustration, for the MB, the reference data includes R' pixel data towards the right from C1, L' pixel data towards the left from C1, B' pixel data towards the bottom from C1 and T' pixel data towards the top from C1.

Figure 5:
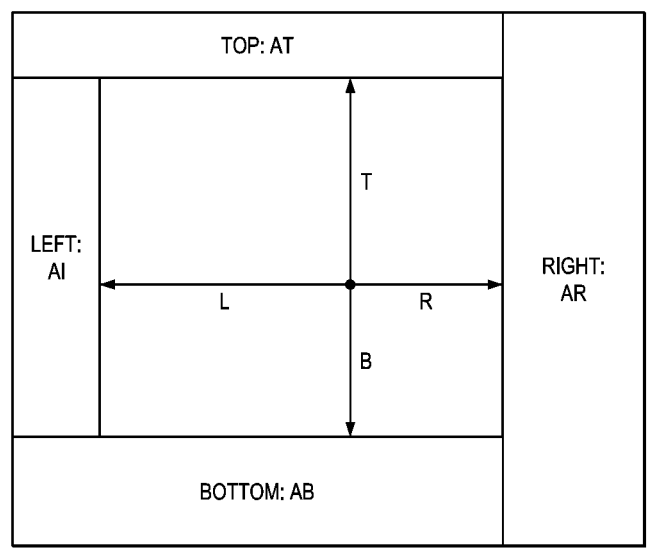
FIG. 5 illustrates a fetching scheme for a reference data block, in accordance with one embodiment.
Figure 6:
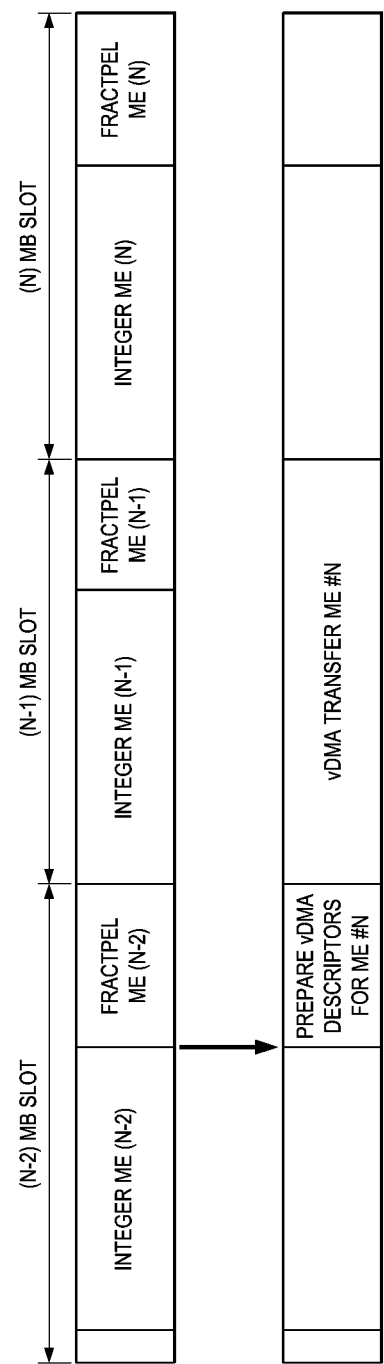
FIG. 6 is an illustration of a pipelining technique, in accordance with one embodiment.

FIG. 5 illustrates a fetching scheme for the reference data block 400. The reference data transfer scheme breaks the fetching of necessary reference data into 4 parts right, top, bottom, and left. For example, consider the reference data block 400. For each part the amount of data needed is as follows:

$A_R = U(R'-R+16)*(B'-T'+1)$ {where $U(x)=x$ for $x>0$, and 0 otherwise}  Right Area $A_T = U(T-T')*(R-16-L'+1)$  Top Area $A_B = U(B'-B)*(R-16-L'+1)$  Bottom Area $AL = U(L-16-L')*(B-T+1)$  Left Area FIG. 6 is an exemplary illustration of a pipelining technique. After MB #N−2 completes an integer pel motion search, a direct memory access (DMA) command preparation for MB #N can begin, as MB#N uses integer predictor from MB #N−2. During the MB #N−1 slot, a DMA controller associated with motion estimation transfers data from the external memory to the internal memory thereby allowing motion estimation to take place in slot MB#N.

As the vertical search range is increased in case of the sliding window approach, bandwidth requirement of the external memory increases linearly. Using the reference data transfer scheme, if the vertical search range is increased then there is less increase in external memory bandwidth requirement.

Table 1 is an illustration of various memory requirements for the sliding window technique and the reference data transfer scheme:

TABLE 1

| Average Bytes per MB needed | Search Range: +/−144 (H), +/−32 (V) | Search Range: +/−144 (H), +/−48 (V) | Search Range: +/−144 (H), +/−64 (V) |
| --- | --- | --- | --- |
| Sliding window approach | 1322 | 1851 | 2380 |
| Reference data transfer scheme in the present disclosure | 757 | 771 | 774 |
| % Saving in external memory traffic | 43% | 58% | 67% |

The reference data transfer scheme results in saving of bandwidth by 43% for the vertical search range of +/−32 for the coding method where Intra (I) and Predictive Pictures (P) (IPP) coding types are used.

Table 2 is an illustration of various memory requirements for the reference data transfer scheme for the P picture and the B picture.

TABLE 2

| Average Bytes per MB needed, Horizontal Search Range of +/−144 pixels | Search Ranges: P Picture: +/−64 (V), B Picture: +/−24 (V) | Search Ranges: P Picture: +/−64 (V), B Picture: +/−48 (V) | Search Ranges: P Picture: +/−96 (V), B Picture: +/−64 (V) |
| --- | --- | --- | --- |
| Reference data transfer scheme in the present disclosure (P picture, B Picture) | 1406, 1617 | 1451, 1699 | 1534, 1867 |
| % Saving in external memory traffic | 41%, 23.5% | 39%, 54% | 55%, 61% |

The reference data transfer scheme used results in savings of 41% for the P picture and 23.5% for the B picture for the search ranges of +/144 H and +/−64 V for the P picture and +/144 H and +/−24 V for the B picture. At search ranges of +/144 H and +/−96 V for the P picture and +/144 H and +/−64 V for the B picture the gain is greater than 50%.

The use of the reference data transfer scheme reduces external memory traffic for an existing search range and employs increased search ranges for an existing external memory bandwidth.

Those skilled in the art will recognize that a wide variety of modifications, alterations, and combinations can be made with respect to the above described embodiments without departing from the scope of the present disclosure, and that such modifications, alterations, and combinations are to be viewed as being within the ambit of the inventive concept.

Figure 7:
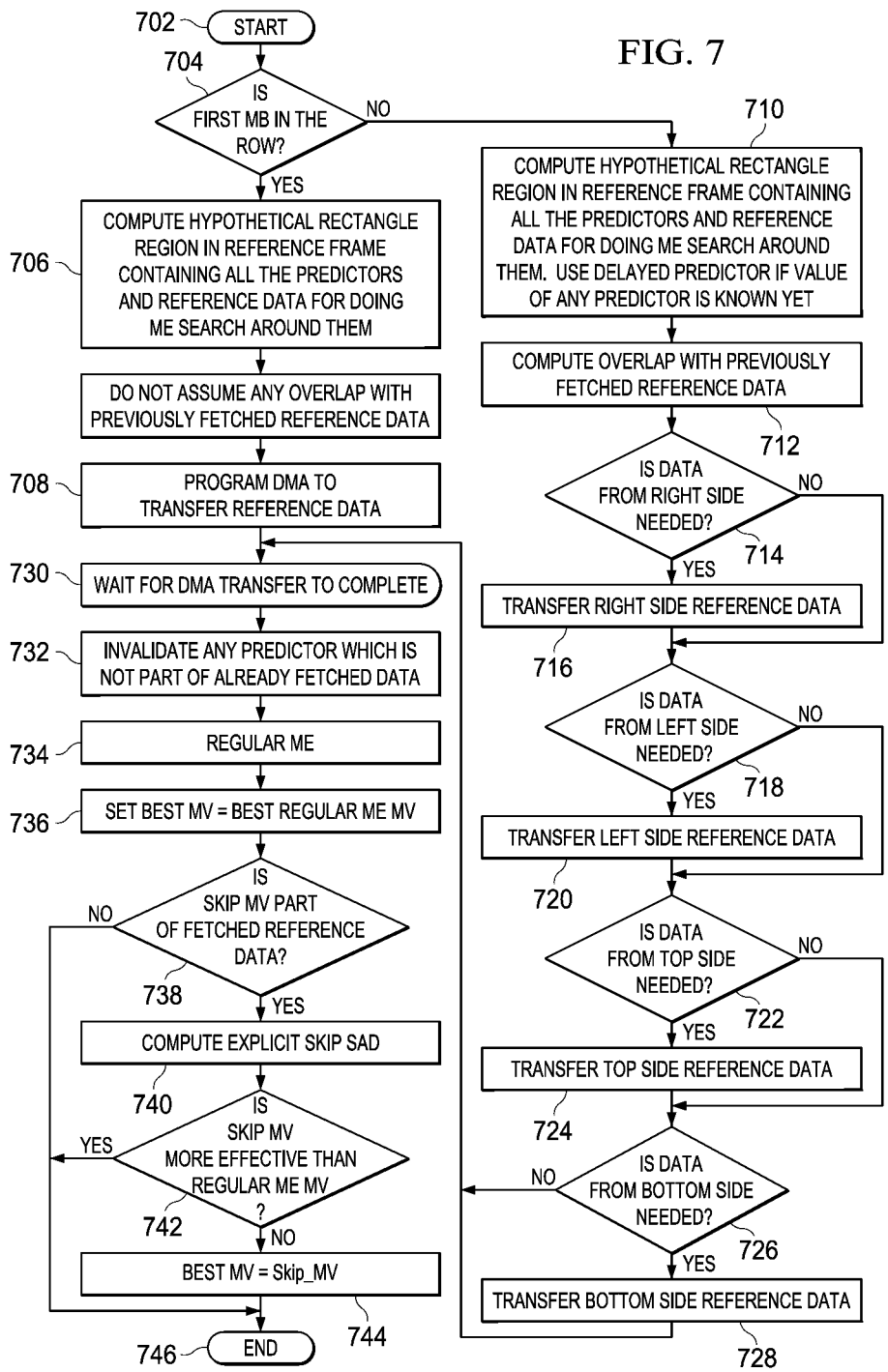
FIG. 7 is an illustration of a method for predicting reference data transfer scheme for motion estimation, in accordance with one embodiment.

FIG. 7 is an illustration of a method 700 for predicting reference data transfer scheme for motion estimation. The method 700 starts at step 702 and proceeds to step 704. If At step 704, determines if the MB is first in the row. If it is first MB in the row, the method 700 proceeds to step 706. At step 706, the method 700 computes hypothetical rectangle region in reference frame containing all the predicting and reference data for doing motion estimation search around the region. At step 708, the method 700 transfers reference data. The method 700 proceeds from step 708 to step 730.

If the MB is not first in the row, the method 700 proceeds to step 710. At step 710, the method 700 computes hypothetical rectangle region in reference frame containing all the predictive and reference data for doing motion estimation search around the region. If the value of the predictor is unknown, the method 700 may use delayed predictors. A step 712, the method 700 computes overlap with previously fetched reference data. At step 714, the method 700 determines if the data from the right side is needed. If the data is needed, then the method 700 proceeds to step 716, wherein the method 700 transfers right side data and proceeds to step 718. Otherwise, the method 700 proceeds to step 718. At step 718, the method 700 determines if the data from the left side is needed. If the data is needed, then the method 700 proceeds to step 720, wherein the method 700 transfers right side data and proceeds to step 722. Otherwise, the method 700 proceeds to step 722. At step 722, the method 700 determines if the data from the top side is needed. If the data is needed, then the method 700 proceeds to step 724, wherein the method 700 transfers right side data and proceeds to step 726. Otherwise, the method 700 proceeds to step 726. At step 726, the method 700 determines if the data from the bottom side is needed. If the data is needed, then the method 700 proceeds to step 728, wherein the method 700 transfers bottom side data and proceeds to step 730. Otherwise, the method 700 proceeds to step 730.

At step 730 the method 700 wait for data transfer to be complete. At step 732, the method 700 invalidates any predictor which is not part of already fetched data. At step 734, the method 700 performs regular motion estimation. At step 736, the method 700 sets the best motion vector base on result of regular motion estimation. At step 738, the method 700 determines if the motion vector of the reference data can be skip coded. If not, then the method 700 proceeds to step 746. Otherwise, the method 700 proceeds to step 740. At step 740 the method 700 computes explicit skip SAD. At step 742, the method 700 determines if the motion vector set is effective. If it is effective, then the method 700 proceeds to step 746. Otherwise, the method 700 proceeds to step 744 wherein the motion estimation is unset and the initial value is maintained. The method 700 proceeds to step 746. At step 746, the method 700 ends.

While the foregoing is directed to embodiments of the present invention, other and further embodiments of the invention may be devised without departing from the basic scope thereof, and the scope thereof is determined by the claims that follow.

What is claimed is:

1. A method of a processor for predicting reference data transfer scheme for motion estimation, comprising:
    computing, via the processor, hypothetical rectangle region in reference frame containing all the predicting and reference data for doing motion estimation search around the region;
    if the macroblock is not the first in a row, utilizing overlap with previously fetched reference data, computing overlap with previously fetched reference data, and transferring needed data;
    invalidating any predictor, wherein the predictor is not part of the fetched data; and
    regulating the motion estimation and setting the motion vector to an effective value based on the fetched and computed data.

2. The method of claim 1, wherein the step of transferring the needed data comprises determining if at least one of the right side data, left side data, top side data or bottom side data is needed.

3. The method of claim 1, wherein the step of setting the motion vector to an effective value comprises testing one or more values.

* * * * *